Nov. 19, 1929.  G. L. ANDERSON ET AL  1,736,108
GUIDE SUSPENSION FOR DRAWERS AND OTHER MOVABLE ELEMENTS
Filed Oct. 6, 1925   2 Sheets-Sheet 1
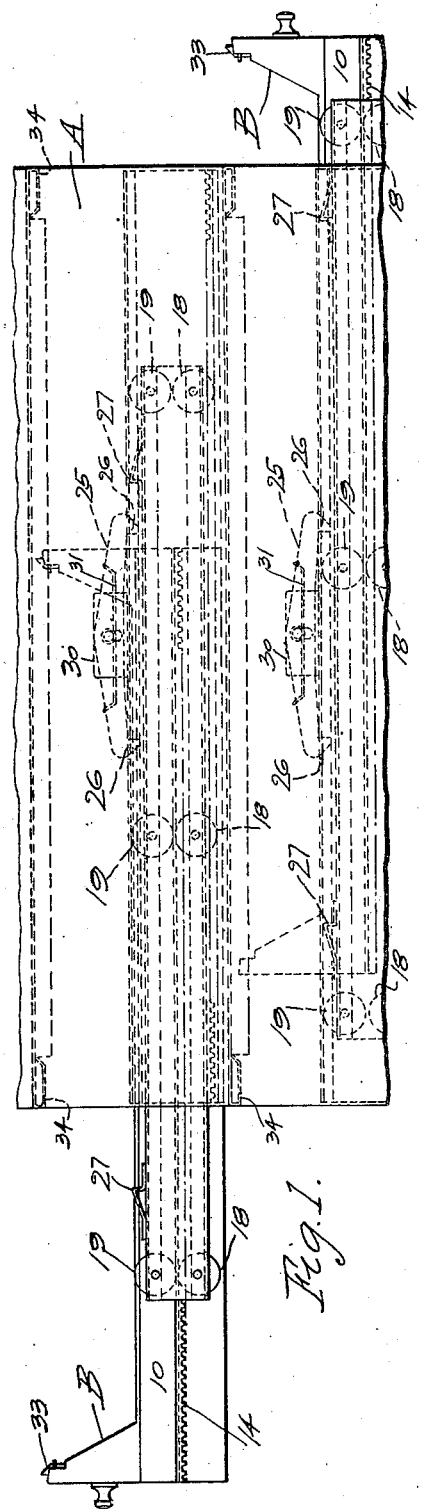
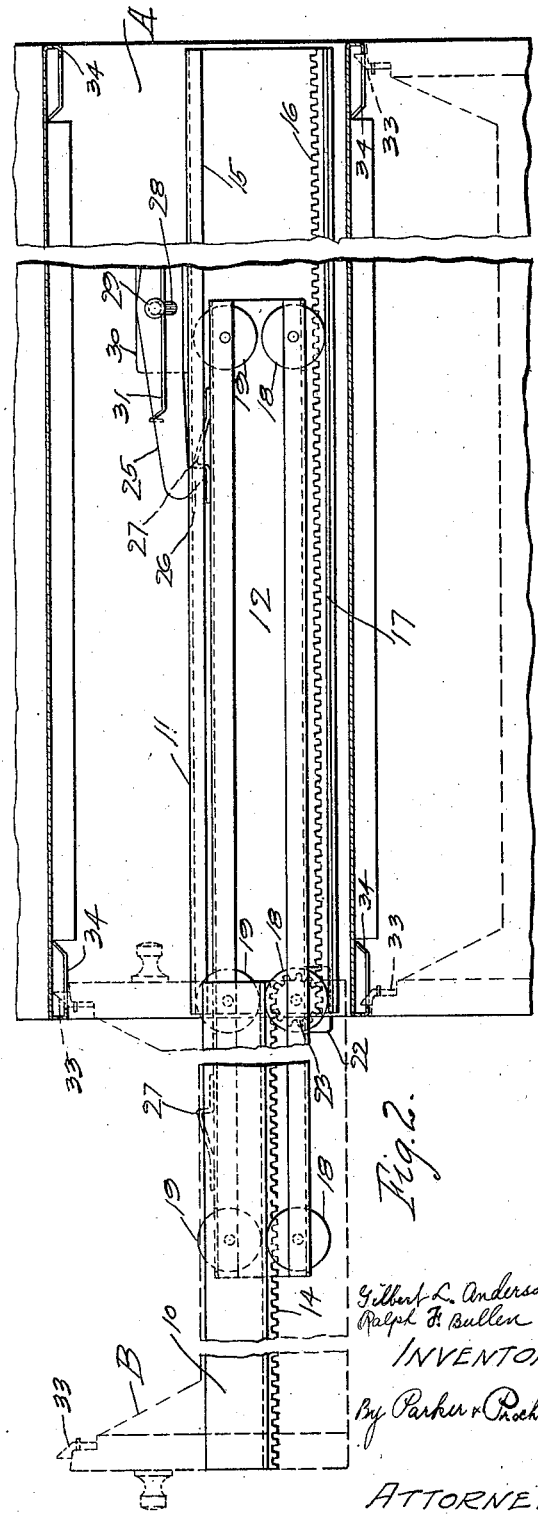
Gilbert L. Anderson
Ralph F. Bullen
INVENTORS
By Parker & Prochnow
ATTORNEYS

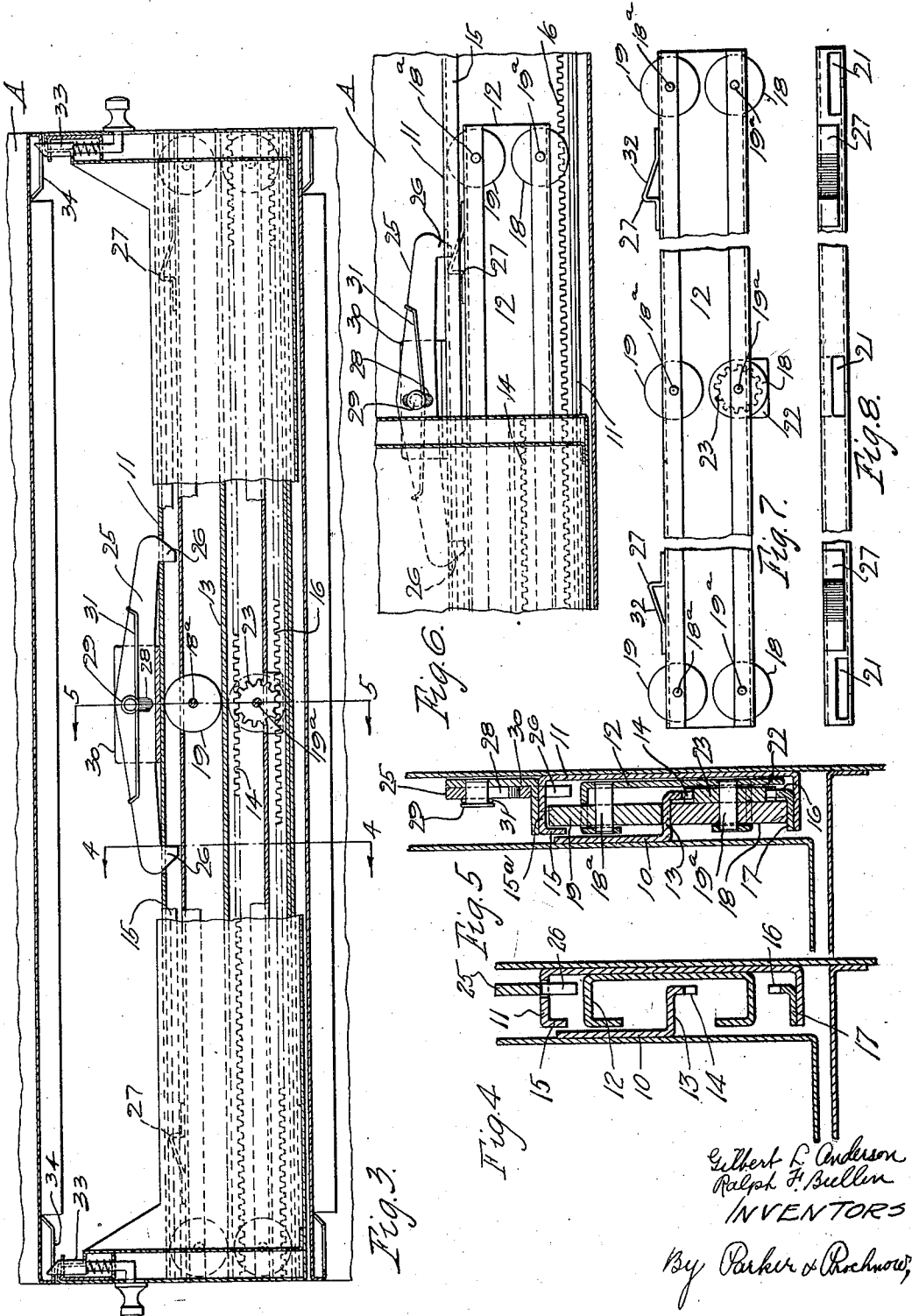

Patented Nov. 19, 1929

1,736,108

UNITED STATES PATENT OFFICE

GILBERT L. ANDERSON AND RALPH F. BULLEN, OF JAMESTOWN, NEW YORK, ASSIGNORS TO ART METAL CONSTRUCTION COMPANY, OF JAMESTOWN, NEW YORK

GUIDE SUSPENSION FOR DRAWERS AND OTHER MOVABLE ELEMENTS

Application filed October 6, 1925. Serial No. 60,782.

This invention relates to extensible guides or suspensions of that kind used for the drawers of filing cabinets and analogous sliding elements or devices, in which the guide or suspension is made with an extension or telescopic sliding section or member constructed and arranged to be extended when the drawer or element is pulled out so as to permit the drawer or element to project for substantially its full length out of the cabinet or support and to maintain the drawer or element horizontal and cause a free movement thereof.

One of the objects of this invention is to provide a practical and desirable extensible guide or suspension of this character which is of comparatively simple and inexpensive construction, but which will insure a free, easy movement of the drawer or element with the minimum of noise, and will insure simultaneous and equal movements of the guide members at opposite sides of the drawer so as to always retain the drawer and guide members parallel with each other and prevent any binding of the parts in the in and out movements of the drawer, and so as also to produce a positive but differential travel of the extension members of the guide which moves in and out as the drawer is moved in and out.

Another object of the invention is to provide an extensible guide with a rack and pinion mechanism of simple and inexpensive construction, which will cause a positive and differential travel of the extension guide member relatively to the movement of the drawer or element when the element is pulled out or pushed in, so that the extension member will be caused to travel whenever the drawer is moved, without requiring the drawer to complete part of its travel before it moves the extension, thus avoiding the objectionable noise and constrained jerky movement incident to suspensions of that kind in which the drawer or element moves outwardly or inwardly partway, before it initiates the movement of the extension member of the guide or suspension. Other objects of the invention are to provide a guide or suspension adapted to permit the drawer or element to be moved out of or relatively to the case or support from either of the opposite sides thereof and to operate in the same manner to guide and support the element, irrespective of whether it is operated from one or the other side of the case or support; also to provide a stop mechanism which cooperates with the element or movable member of the guide or suspension to arrest the movement of the same when the latter has been pulled out to the intended limit in either direction, so as to prevent the element or movable guide member from being accidentally disconnected from the cabinet or support so as to permit it or the element to fall; and also to improve guides or suspensions for drawers and analogous devices in the other respects hereinafter described and set forth in the claims.

In the accompanying drawings, the invention is shown as applied to the drawers of a cabinet and will be so described herein, but it will be manifest that the guide or suspension is adapted for use for guiding and supporting other devices which operate in the manner of drawers. In said drawings:

Fig. 1 is a fragmentary side elevation of a cabinet or case provided with drawer guides or suspensions embodying the invention and showing two drawers partially withdrawn from opposite sides of the cabinet.

Fig. 2 is a longitudinal, sectional elevation thereof, on an enlarged scale, showing the guide members at the far side of the drawer.

Fig. 3 is a longitudinal, sectional elevation through the drawer, showing the drawer closed, the drawer being partly broken away to show the guide members at the far side of the drawer.

Fig. 4 is a transverse section thereof on line 4—4, Fig. 3.

Fig 5 is a transverse section thereof, on an enlarged scale, on line 5—5, Fig. 3.

Fig. 6 is a longitudinal, sectional elevation showing the position of the stop device when the stop at one end of the extension guide member is passing one of the stops on the stop device.

Fig. 7 is an inside elevation of the extension guide member.

Fig. 8 is a plan view thereof with the rollers and pinions omitted.

A represents a drawer cabinet or case, and B represents drawers or analogous movable elements arranged in the case and adapted to be pulled outwardly from either of the opposite sides of the case A. The case A and the drawers may be of any usual or desired construction. The drawers or movable elements A are supported and guided in their in and out movements so as to be retained horizontal when projecting outwardly from the case, by an extensible guide or suspension device comprising guides arranged at opposite sides of the drawer. The guides at opposite sides of the drawer are similar, except that the position of the parts is reversed, and only the guide at one side of the drawer will be described.

Each guide comprises a drawer or movable member 10 which is fixed to the drawer, a case or stationary member 11 which is fixed to the case, and an intermediate or extension member 12 which cooperates with and is adapted to slide or travel relatively to both the drawer member 10 and the case member 11. The drawer member 10 preferably consists of a strip of sheet metal which is bent into substantially Z shape, having an upper vertical flange which is welded or otherwise suitably secured to the side of the drawer, a web or track portion 13 which extends laterally outwardly from the drawer, and a downbent flange at the outer edge of the track 13 which is provided along its bottom edge with rack teeth 14. The stationary member 11 preferably consists of a channel-shaped strip of sheet metal having its vertical web welded or otherwise rigidly secured to the side of the case. The upper flange 15$^a$ of this stationary member preferably has a downbent edge 15 adjacent the drawer, and the bottom flange of the member 11 is provided with a toothed rack 16 which is arranged parallel with and opposite the toothed rack 14 on the drawer member 10. The toothed rack 16 is shown as being formed by a separate angle strip 17 welded or otherwise rigidly secured to the bottom flange of the stationary member 11, so as to constitute in effect a part of said member, and forms a stationary track for the rollers of the extension member 12. The rack 16 is located in a vertical plane between the roller track 17 and the web of the stationary member 11.

The intermediate or extension member 12 preferably consists of a channel-shaped, sheet metal strip having the outer edges of its upper and lower flanges bent respectively downwardly and upwardly, or towards each other. Rollers 18 are journalled on the lower portion of the extension member 12 adjacent its opposite ends and midway between its ends, and similar rollers 19 are journalled on the upper portion of the extension member near its opposite ends and midway between its ends, the lower rollers 18 being adapted to roll on the stationary track 17 at the bottom of the stationary member 11, and the upper rollers being adapted to roll on the upper face of the movable horizontal track or web 13 of the drawer member. In the movements of the drawer, the lower rollers 18 are also adapted to engage the under face of the movable track 13 of the drawer member 10, while the upper rollers 19 are adapted to engage the under face of the upper flange 15$^a$ of the stationary member 11, which thus forms an upper stationary track. The lower rollers are preferably journalled on axles or pins 19$^a$ secured in holes in the web and upbent lower flange edge of the extension member 12, and the upper rollers are similarly journalled on axles or pins 18$^a$ secured in holes in the web and downbent edge of the upper flange of the member, the upper rollers projecting through slots 21 in the upper flange of the extension member and the lower rollers projecting through similar slots in the lower flange of the member.

The upper rollers 19 extend up behind the downbent flange edge 15 of the stationary member 11, while a lug 22, Fig. 5 depends from the lower edge of the extension member behind the rack 16, and the lower rollers 18 extend up in front of the rack 14 on the drawer. Therefore, the several guide members are interlocked and the lateral disengagement or disconnection of the drawer from the extension member, and the latter from the stationary member, is prevented.

23 indicates a pinion which is journalled on the extension member 12 beside the lower, middle roller 18, to turn about the same axis as said roller, the pinion being preferably detached from the roller and arranged to turn loosely on the axle for said roller 18. This pinion meshes with the toothed racks 14 and 16 so that when the drawer is moved either inwardly or outwardly, the toothed rack 14 connected to the drawer will turn the pinion and cause the latter to roll in engagement with the toothed rack on the stationary member, thereby causing the positive travel of the extension member 12 with the drawer whenever the drawer is moved, but since the pinion is journalled on the extension member 12, the distance which the pinion and the member 12 advance along the stationary rack 16 will be the same, and the extension member 12 will move at half the speed of movement and for half the distance of the drawer. Thus, when the drawer is pulled out or shoved in, the extension member 12 will be similarly moved outwardly or inwardly, and when the drawer is pulled out to its full extent, the extension member will project half way out of the case and form a projecting support for the drawer. When the drawer is in its closed position, it rests through the medium of the drawer member 10, upon the lower rollers, which in turn rest upon the lower track of the stationary member. As the drawer is pulled out of the case, for instance, to the left, the racks and pinion and the rolling contact between the rollers and drawer and stationary guide members will cause the extension member to travel outwardly with the drawer, the drawer member 10 rolling on the left hand end and intermediate lower rollers 18, and the latter roller rolling on the lower track of the stationary member 11. After the initial portion of this movement of the drawer, the lower, left hand roller passes off of the track 17, and the overhanging weight of the drawer on the extension member lifts the right hand end of the member causing the right hand, upper roller 19 to roll against the upper track of the stationary member so that the drawer and extension member will have freely moving, rolling guide bearings respectively on the extension member and on the stationary member of the guide. The upper, middle roller 19, bearing against the drawer track 13, prevents the tipping of the drawer out of the intended horizontal position due to the weight of or pressure on the outer end of the drawer when it projects out beyond the case. When the drawer is pulled outwardly in the opposite direction, that is to the right, it will be retained horizontally and afforded similar rolling support since the arrangement of the rollers and the tracks is the same at opposite ends of the guide. In both the inward and outward movements of the drawer, whether to one or the other side of the case, the extension member will be caused, by the racks and pinion, to positively move in the same direction as the drawer at half the speed of movement of the latter. The arrangement of the pinions meshing with the opposed racks at the opposite sides of the drawer will insure simultaneous and exactly corresponding movements of the extension members at the opposite sides of the drawer, and there cannot be any slipping or unequal movement of said extension members and of the opposite sides of the drawer, thereby preventing any binding of the drawer and guide members.

25 represents a dog or stop device for arresting the outward movement of the drawer and of the movable or extension guide member when the drawer has been pulled out to the intended limit, at either side of the case, that is to a position in which it projects for substantially its full length out of the case. This device 25 in the preferred construction shown, is in the form of a centrally pivoted lever pivotally mounted in the case midway between the ends thereof and having at its opposite ends stops or lugs 26 which project through holes in the top flange of the stationary guide member 11 into the path of movement of cooperating stops 27 on the upper edge of the movable guide member near the opposite ends thereof. The dog 25 is provided midway of its length with a vertical slot 28 into which projects the stud or pivot 29 for the dog. This pivot is preferably secured to a bracket 30 which is rigidly secured on the upper edge of the stationary member 11 of the guide. The dog is adapted to rock on this pivot and also to move bodily up and down on the pivot by reason of the length of the slot 28 through which the pivot passes. A suitable spring 31 acts on the dog to normally hold it in the horizontal position shown in Fig. 3 and to permit either end of the dog to be lifted while the opposite end of the dog fulcrums on the upper edge of the stationary guide member 11, and to return the dog to its horizontal position shown in Fig. 3, when the lifting pressure on either end of the dog is removed. The spring 31 preferably consists of a spring wire coiled about the dog pivot 29 and having bent ends hooked over the upper edge of the dog at opposite sides of the pivot. Each of the stops 27 on the movable guide member has an inclined or bevelled outer end 32 and an abrupt, inner end. Similarly, the stop lugs 26 of the dog are provided with inclined or bevelled outer ends and abrupt inner ends. When the movable guide member is moved outwardly to the left, the right hand stop 27 will engage the bevelled end of the right hand lug 26 of the dog and raise this end of the dog and pass the lug, permitting continued movement of the extension member to the left until the inner end of the right hand stop 27 strikes the abrupt end of the left hand stop lug 26, which prevents further outward movement of the movable guide member. When the movable member is returned or moved inwardly, the bevelled end of the right hand stop 27 will lift the lug at the right hand end of the dog 25, which will permit the stop to pass the lug and permit the return of the movable guide member to its normal position in the case. Similarly, when the movable member is pulled outwardly to the right, the left hand stop 27 thereof will pass the stop lug 26 at the left hand end of the dog and permit continued outward movement of the movable guide member until it is arrested by the engagement of the abrupt face of the left hand stop 27 with the abrupt face of the lug at the right hand end of the dog 25. When the movable guide member is returned from its outward, right hand position, the left hand stop 27 is adapted to pass by the stop lug at the left end of the dog. Thus, the dog or stop device 25 acts to limit the outward movement of the movable guide member whether it be pulled out of the case from the left hand or right hand side thereof.

Since the pinion 23, which is journalled on the extension member 12, meshes with the toothed racks on the drawer and stationary guide member, the pinion cannot rotate except by movement of the extension member.

Therefore, when the outward movement of the extension member is arrested by the dog 25, the pinion prevents further outward movement of the drawer so that the dog thus operates by arresting the extension member to also arrest the outward movement of the drawer.

While in the construction shown, the track 13 is attached to the drawer B and moves with it, and the channel member 11 is the stationary member, it will be manifest that the guide could be reversed, that is, the operation would be the same with the member 11 attached to the drawer B or element to be moved, and the track 13 stationarily mounted.

Each drawer is preferably equipped at opposite ends with latches 33 of any suitable construction adapted to engage slotted keepers 34 on the case for retaining the drawer in closed position and preventing the withdrawal of the drawer from either side of the case without first releasing the latch at that side of the case. The keeper slots are open at their inner ends so that they do not prevent inward movement of the latches with the drawer.

We claim as our invention:

1. In a guide suspension for a movable element, the combination of parallel movable toothed racks secured to said element at its opposite sides, a cooperating stationary toothed rack parallel to each of said movable racks, extension supporting members arranged to travel relatively to said stationary and movable racks, movable tracks connected to said element, cooperating stationary tracks, rollers journalled on said extension members and arranged to roll on said cooperating movable and stationary tracks to form a rolling guide support for said element, and a pinion journalled on each extension member and meshing with the adjacent cooperating toothed racks for causing simultaneous and equal movements of the extension members at opposite sides of the element.

2. In a guide suspension for a movable element, the combination of parallel movable toothed racks secured to said element at its opposite sides, a cooperating stationary toothed rack opposite and parallel to each of said movable racks, extension supporting members arranged to travel relatively to said stationary and movable racks, upper and lower stationary tracks at each side of said element, movable tracks connected to move with said element and arranged between said stationary tracks, rollers journalled on said extension members above and below said movable tracks and cooperating with the upper and lower stationary and movable tracks to form rolling guide supports for said element, and a pinion journalled on each extension member and meshing with the adjacent cooperating stationary and movable toothed racks to cause simultaneous and equal movements of the extension members at opposite sides of the element.

3. In a guide suspension for a movable element, the combination of parallel movable toothed racks secured to said element at its opposite sides, a cooperating stationary toothed rack parallel to each of said movable racks, said cooperating movable and stationary racks having oppositely facing teeth, upper and lower stationary tracks at each side of said element, a track movable with said element at each side thereof between said upper and lower stationary tracks, an extension guide member at each side of said element movable relatively to said stationary and movable tracks, rollers journalled on said extension member and cooperating with said stationary and movable tracks to form a rolling extensible guide for said element, and a pinion journaled on each extension member and meshing at the opposite sides of its axis with the stationary and movable toothed racks at one side of said element for causing simultaneous and equal movements of said extension members.

4. In a guide suspension for a movable element the combination of parallel movable toothed racks secured to said element at its opposite sides, a cooperating stationary toothed rack opposite and parallel to each of said movable racks, upper and lower stationary tracks at each side of said element, a track secured to said element at each side thereof between said upper and lower stationary tracks, an extension guide member at each side of said element movable relatively to said stationary and movable tracks, upper rollers journalled on said extension member at the ends and middle portion thereof and cooperating with said movable track and stationary upper track, lower rollers journalled on said extension member at the ends and intermediate portions thereof and cooperating with said stationary lower track and movable track to form a rolling extensible guide support for the drawer, and a pinion journalled on the intermediate portion of each of said extension supporting members and meshing with said stationary and movable toothed racks to cause simultaneous and equal movements of the extension supporting members at opposite sides of the drawer.

5. In a guide suspension for a movable element, the combination of a stationary member, a movable member, secured to said movable element, one of said members having upper and lower tracks and said other member having a track disposed between and parallel with said upper and lower tracks, an extension supporting member movable relatively to said stationary and movable members, upper and lower rollers journalled on said extension member at the end and intermediate portions thereof to turn in vertical planes and cooperating with said upper, lower and intermediate tracks to form a rolling extensible guide and support for the drawer or element, a toothed rack on said stationary member, a toothed rack on said movable member, said toothed racks having opposed teeth and a pinion journalled on said extension member between and meshing with said opposed teeth of said stationary and movable toothed racks to cause the positive travel of said extension member when said element is moved.

6. In a guide suspension for a movable element, the combination of a stationary member, a movable member secured to said movable element, one of said members having upper and lower tracks and said other member having a track disposed between and parallel with said upper and lower tracks, an extension supporting member movable relatively to said stationary and movable members, upper and lower rollers journalled on said extension member at the end and intermediate portions thereof to turn in vertical planes and cooperating with said upper, lower and intermediate tracks to form a rolling extensible guide and support for the drawer or element, a toothed rack on said stationary member, an opposed toothed rack on said movable member, and a pinion journalled on said extension member coaxially with one of said intermediate rollers and meshing with said stationary and movable toothed racks to cause the positive travel of said extension member when said element is moved.

7. In a guide suspension for a movable element, the combination of a stationary member, a movable member secured to said movable element, one of said members being of channel form and having opposed upper and lower tracks, and said other member being of substantially Z-form and having a track arranged between said upper and lower tracks, an extension supporting member movable relatively to said stationary and movable tracks, rollers journalled on the end and intermediate portions of said extension member and cooperating with said upper and intermediate tracks, rollers on the end and intermediate portions of said extension member and cooperating with said intermediate and lower tracks, a toothed rack on said stationary member, a toothed rack on said movable member, said toothed racks having opposed teeth and a pinion journalled on said extension member between and meshing with said opposed teeth of said toothed racks for causing positive travel of said extension member when said element is moved.

8. In a guide suspension for a movable element, the combination of a stationary guide member and a movable guide member cooperating to guide and support said element, said element being adapted to be moved outwardly from opposite ends of said stationary guide member, a stop device for limiting the outward movement of said movable guide member in opposite directions, said stop device comprising a dog movably mounted between the opposite ends of one of said members and having stops at its opposite ends, cooperating stops at the opposite end portions of said other guide member, the stop at each end of the last mentioned guide member being arranged to engage and shift said dog to permit said stop to pass the adjacent stop on the dog and engage with the far stop dog to arrest the movement of said movable guide member.

9. In a guide suspension for a movable element, the combination of a stationary guide member and a movable guide member cooperating to guide and support said element, said element being adapted to be moved outwardly from opposite ends of said stationary guide member, a stop lever for limiting the outward movement of said movable guide member in opposite directions, said lever being pivotally mounted between the ends of one of said members and having stops at opposite sides of its pivot, cooperating stops at the end portions of said other guide member, said opposite stops of the lever being movable toward and from the path of movement of the cooperating stops, the stop at each end of the last mentioned guide member being arranged to pass the adjacent stop on the lever and engage with the far stop thereon to arrest the movement of said movable guide member.

10. In a guide suspension for a movable element, the combination of a stationary guide member and a movable guide member cooperating to guide and support said elements, said element being adapted to be moved outwardly from opposite ends of said stationary guide member, a stop device for limiting the outward movement of said movable guide member in opposite directions, said stop device being arranged between the ends of one of said members and comprising a lever pivotally mounted between its ends to tilt and also to move bodily toward and from said movable guide member and having opposed stops at its opposite ends, cooperating stops at the opposite end portions of said other guide member, each of said cooperating stops being adapted to move and pass the stop at the adjacent end of said stop device and engage the stop at the far end of said stop device to arrest the movement of said movable guide member.

11. In a guide suspension for a movable element, the combination of a stationary guide and supporting member, a movable guide and supporting member, an extension supporting member movable relatively to said stationary and movable members, complementary means on said members for guiding and supporting said movable member on said extension member and the latter on said stationary member, opposed toothed racks on said stationary and movable members, and a pinion journalled on said extension member and meshing at opposite sides of its axis with said opposed toothed racks for causing positive differential travel of said movable and extension members.

12. In a guide suspension for a movable element, the combination of a stationary guide and supporting member, a movable guide and supporting member, said members having complementary tracks and opposed toothed racks, an extension supporting member movable relatively to said stationary and movable members, rollers cooperating with said extension member and the complementary tracks on said stationary and movable members to provide rolling bearings for said movable track member and for said extension member, and a pinion journalled on said extension member and meshing at opposite sides of its axis with said opposed toothed racks for causing positive differential travel of said movable and extension members.

GILBERT L. ANDERSON.
RALPH F. BULLEN.